(12) United States Patent
Gautier et al.

(10) Patent No.: US 8,644,370 B2
(45) Date of Patent: Feb. 4, 2014

(54) PROVIDING SLOPE VALUES FOR A DEMAPPER

(75) Inventors: Emmanuel Gautier, Betton (FR); Olivier Souloumiac, St Sulpice la Foret (FR)

(73) Assignee: Silicon Laboratories, Austin, TX (US)

( * ) Notice: Subject to any disclaimer, the term of this patent is extended or adjusted under 35 U.S.C. 154(b) by 65 days.

(21) Appl. No.: 13/357,907

(22) Filed: Jan. 25, 2012

(65) Prior Publication Data

US 2013/0188680 A1 Jul. 25, 2013

(51) Int. Cl.
*H04L 27/00* (2006.01)

(52) U.S. Cl.
USPC ........... 375/232; 375/259; 375/341; 375/316; 375/340; 375/346; 375/229; 375/285

(58) Field of Classification Search
USPC .......... 375/316, 340, 341, 229, 285, 342, 346
See application file for complete search history.

(56) References Cited

U.S. PATENT DOCUMENTS

| | | | |
|---|---|---|---|
| 5,535,220 A | 7/1996 | Kanno et al. | |
| 5,754,252 A | 5/1998 | Kuhn et al. | |
| 6,128,043 A | 10/2000 | Tulder | |
| 6,542,203 B1 | 4/2003 | Shadwell et al. | |
| 6,625,234 B1 | 9/2003 | Cui et al. | |
| 6,630,964 B2 | 10/2003 | Burns et al. | |
| 6,721,908 B1 | 4/2004 | Kim et al. | |
| 6,862,325 B2 | 3/2005 | Gay-Bellile et al. | |
| 7,170,849 B1 | 1/2007 | Arivoli et al. | |
| 7,265,792 B2 | 9/2007 | Favrat et al. | |
| 7,359,311 B1* | 4/2008 | Paranjpe et al. | 370/203 |
| 7,369,835 B2 | 5/2008 | Margairas et al. | |
| 7,426,240 B2 | 9/2008 | Peron | |
| 7,440,392 B2 | 10/2008 | Hwang | |
| 8,050,342 B2* | 11/2011 | Wang et al. | 375/260 |
| 2002/0085648 A1 | 7/2002 | Burns et al. | |
| 2004/0123226 A1 | 6/2004 | Lee et al. | |
| 2005/0265486 A1 | 12/2005 | Crawley | |
| 2006/0206778 A1 | 9/2006 | Wehn et al. | |
| 2006/0222115 A1 | 10/2006 | Dornbusch | |
| 2008/0086671 A1 | 4/2008 | Garg et al. | |

(Continued)

FOREIGN PATENT DOCUMENTS

WO  WO 2003067877  8/2003
WO  WO 2007001305  1/2007

OTHER PUBLICATIONS

U.S. Appl. No. 13/023,707, filed Feb. 9, 2011, entitled "Memory-Aided Synchronization in a Receiver," by Eric Vapillon, et al.

(Continued)

*Primary Examiner* — Siu Lee
(74) *Attorney, Agent, or Firm* — Trop, Pruner & Hu, P.C.

(57) ABSTRACT

In one embodiment, a method can provide for dynamic updating of slope values used in determining a soft decision for a demodulated signal obtained in a receiver from a broadcast signal received by the receiver. The method includes generating a channel estimate for a channel traversed by the signal, computing channel state information from the channel estimate, computing statistical information from the channel state information, determining a slope value based at least in part on the statistical information, calculating a log-likelihood ratio (LLR) value for the signal, and applying the slope value to the LLR value to obtain a weighted LLR value.

23 Claims, 7 Drawing Sheets

(56) References Cited

U.S. PATENT DOCUMENTS

| | | |
|---|---|---|
| 2009/0094470 A1 | 4/2009 | Gao et al. |
| 2009/0213275 A1 | 8/2009 | Trager |
| 2009/0245433 A1* | 10/2009 | Challa et al. ............ 375/341 |
| 2010/0130153 A1 | 5/2010 | Poorfard et al. |
| 2010/0169734 A1 | 7/2010 | Gamage et al. |
| 2010/0328536 A1 | 12/2010 | Hendrickson et al. |
| 2010/0328544 A1 | 12/2010 | Hendrickson et al. |
| 2011/0050998 A1 | 3/2011 | Gao |
| 2011/0242428 A1 | 10/2011 | Blouin et al. |
| 2011/0246849 A1 | 10/2011 | Rault et al. |
| 2011/0246850 A1 | 10/2011 | Rault et al. |
| 2012/0014428 A1* | 1/2012 | Park et al. ............ 375/231 |
| 2013/0051444 A1* | 2/2013 | Roh ............ 375/222 |

OTHER PUBLICATIONS

Ahmad Darabiha, "Power Reduction Techniques for LDPC Decoders," pp. 1-10.

ETSI, Draft ETSI EN 302 307, "Digital Video Broadcasting (DVB); Second generation framing structure, channel coding and modulation systems for Broadcasting, Interactive Services, New Gathering and other broadband satellite applications," V1.2.1, 2009, pp. 1-78.

Micronas, "DRX 3960A Digital Receiver Front-End," Feb. 8, 2001, pp. 1-30.

Xceive, "Welcome to Xceive at CES 2007, Upgrade Your Tuner! Get XC5000," 2007, pp. 1-28.

NXP, "TDA 8295 Digital Global Standard Low IF Demodulator for Analog TV and FM Radio," Nov. 27, 2009, pp. 1-83.

\* cited by examiner

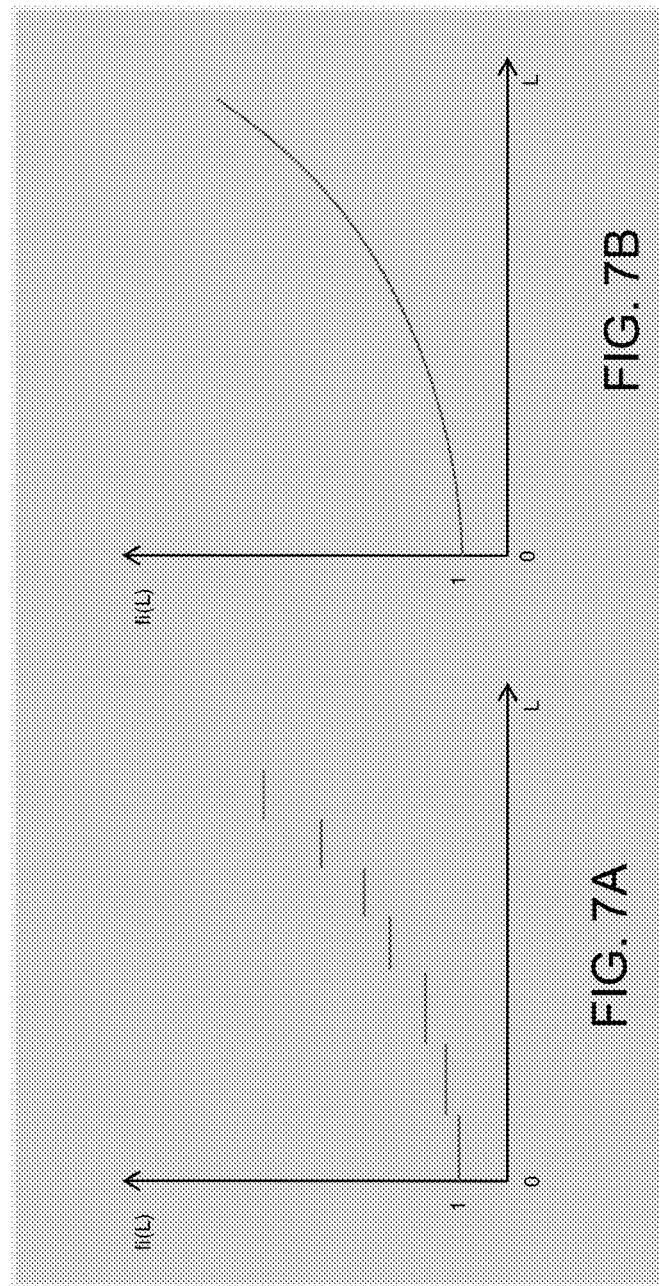

PROVIDING SLOPE VALUES FOR A DEMAPPER

BACKGROUND

The DVB-T2 standard describes a second generation baseline transmission system for digital terrestrial television broadcasting. The specification of the DVB-T2 standard is normalized as ETSI EN 302 755: Digital Video Broadcasting (DVB); Frame structure channel coding and modulation for a second generation digital terrestrial television broadcasting system (DVB-T2).

The DVB-T2 standard is based on a coded orthogonal frequency division multiplexing (COFDM) modulation where an error correcting code is used in conjunction with an OFDM modulation. Generally, concatenated codes are implemented in COFDM systems to ensure better error protection. The concatenated code scheme changes from one standard to another. In DVB-T2 systems the inner and outer codes are both "block codes" (LDPC+BCH). In others standards such as DVB-T and ISDB-T, the inner coder is a "convolutional code" and the outer code is a "block code" (convolutional+Reed Solomon). In both cases some interleavers are used in the chain in order to mitigate the effect of channel artifacts (e.g., frequency selective channel, co-channel interferences, CW interferences, impulsive noise and so forth).

At the receiver side, the inner decoder works in both cases described above on soft decisions, meaning that a hard decision is not made on the received data but instead a reliability of each data point is used to perform a better estimate of the original data. In typical receivers, the soft decisions are quantized on a certain number of bits. The choice of this number of bits can have a large impact on the final size and cost of the receiver, in particular because of the presence in the receiver of deinterleavers, which are memory-consuming. If the number of bits is too small the performance of the receiver will decrease, but on the contrary if the number of bits is too large the memory blocks will be oversized for a small benefit in terms of performance.

SUMMARY OF THE INVENTION

One aspect of the present invention is directed to a method that can provide for dynamic updating of slope values used in determining a soft decision for a demodulated signal obtained in a receiver from a broadcast signal received by the receiver. The method includes generating a channel estimate for a channel traversed by the signal from a transmitter to the receiver, computing channel state information from the channel estimate, computing statistical information from the channel state information, determining a slope value based at least in part on the statistical information, calculating a log-likelihood ratio (LLR) value for the signal, and applying the slope value to the LLR value to obtain a weighted LLR value.

From this weighted LLR value, the receiver can generate hard decision bits from the weighted LLR value using an error correcting decoder. In one embodiment, the statistical information may correspond to a count of channel state information values of a symbol of the signal that is below a threshold value. Different manners of using this statistical information in the determination of a slope value can occur. For example, the statistical information can be applied to one of a set of functions to obtain a weighting value, which is then combined with a reference slope value associated with a type of communication received. In turn, this reference slope value can be based on a code rate and a constellation for the communication. As another example, the statistical information can be used to access a table to determine the weighting value.

Another aspect of the present invention is directed to an apparatus that includes an equalizer to receive a demodulated signal and to output equalized data generated from the demodulated signal, channel state information based on a channel estimate of a channel, and statistical information regarding the channel state information. In addition, the apparatus can include a forward error correction (FEC) circuit to receive the equalized data, the channel state information, and the statistical information and to generate a LLR value based on the equalized data and the channel state information and to automatically adjust a slope value to apply to the LLR value using the statistical information.

Yet another aspect of the present invention is directed to a system that includes a tuner circuit to receive a broadcast signal and to output an intermediate frequency (IF) signal and a digital demodulator circuit coupled to the tuner circuit. In one embodiment, the digital demodulator circuit includes a digitizer to receive and digitize the IF signal, a front end circuit to receive the digitized IF signal and to output a baseband signal, a demodulator to generate a demodulated signal from the baseband signal, an equalizer to receive the demodulated signal and to output equalized data generated from the demodulated signal, channel state information based on a channel estimate of a channel traversed by the broadcast signal, and statistical information regarding the channel state information.

Still further, the digital demodulator circuit can include a FEC circuit coupled to the equalizer to receive the equalized data, the channel state information, and the statistical information and to generate a LLR value based on the equalized data and the channel state information and to scale the LLR value based on a slope value generated using the statistical information. In some embodiments, the tuner circuit and the digital demodulator circuit are configured in a single integrated circuit (IC), and the equalizer or the FEC circuit can include a statistical generator to generate the statistical information from the channel state information.

The FEC circuit may include a slope optimizer to obtain a weighting value based on the statistical information and to combine the weighting value and a reference slope value to obtain the slope value. In addition, the FEC circuit can include a demapper having a bit-metric calculator to generate a plurality of bit-metrics from the equalized data, an applicator including a plurality of gain blocks each to receive a bit-metric and a portion of the slope value and to output a scaled bit-metric, and a quantizer to receive the scaled bit-metrics and to output a scaled and clipped soft decision based thereon.

BRIEF DESCRIPTION OF THE DRAWINGS

FIGS. 7A and 7B are graphical illustrations which show a continuous function and a step function in accordance with one embodiment of the present invention.

DETAILED DESCRIPTION

Embodiments may adapt a slope value or scale factor applied to an estimate of soft decisions, namely to a log-likelihood ratio (LLR) determined in a receiver. In this way, the receiver can follow channel evolution (which degrades a transmitted signal) to obtain the best decoding performance. Embodiments may use channel state information (CSI) to obtain statistical information to infer channel features, and from this statistical information synthesize a weighting value used to provide a scale factor to the LLR. In this way, CSI determined in an equalizer of the receiver enables control of a slope to be used in a demapper of a forward error correction (FEC) circuit of the receiver. As a result, a fast and direct slope adaptation can be realized to obtain the best decoding performance also when starting the receiver.

For purposes of illustration, an implementation that provides slope optimization for a DVB-T2 receiver that receives a DVB-T2 transmitted signal is described. However, understand the scope of the present invention is not limited in this regard and embodiments can be used with any COFDM receiver (e.g., DVB-T, ISDB-T, DVB-C2, WIMAX, or others).

Figure 1:
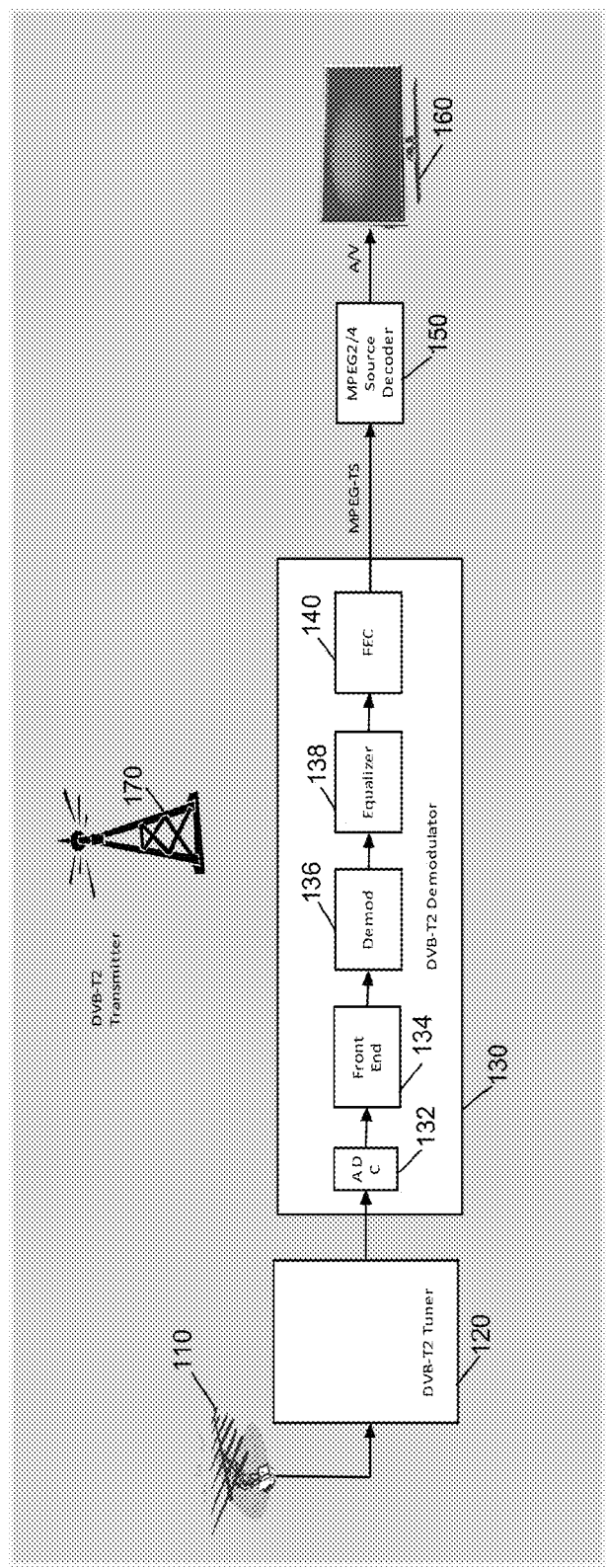
FIG. 1 is a block diagram of a receiver in accordance with an embodiment of the present invention.

Referring now to FIG. 1, shown is a block diagram of a T2 receiver in accordance with an embodiment of the present invention. In the embodiment shown in FIG. 1, system 100 can be used for receiving and processing terrestrial TV signals to provide a media stream to an output device such as a high definition TV 160.

Specifically, the embodiment of FIG. 1 is directed to a DVB-T2 system in which broadcast signals are transmitted by a transmitter 170 and can be received via an antenna 110 which may be an aerial or in-home antenna of a user. The incoming RF signals are provided to a tuner 120, which can be implemented in a single semiconductor die integrated circuit (IC), in some embodiments. This tuner may be in accordance with the DVB-T2 specification. In general, tuner 120 can downconvert the incoming RF signal to a lower frequency, e.g., a low intermediate frequency (IF) and perform further processing such as filtering, gain control and so forth.

The resulting IF signal can then be provided to a demodulator 130 which may be a DVB-T2 digital demodulator that can be implemented on a semiconductor die of a second IC. In one embodiment, demodulator 130 can be implemented in a digital signal processor (DSP), while in other embodiments the demodulator can be formed of discrete logic. Note also that in other implementations that tuner 120 and demodulator 130 can be configured on a single semiconductor die or multiple semiconductor die of a single IC package. In general, demodulator 130 performs various operations including digitization, synchronization, demodulation, equalization and error correction. The resulting output is a transport stream, e.g., an MPEG-TS stream that can be provided to a source decoder 150 which can perform a given type of decoding, e.g., an MPEG 2/4 decoding, to thus generate audio/visual signals that can be provided to output device 160.

As further illustrated in FIG. 1, demodulator 130 can include various components, including an analog-to-digital converter (ADC) 132 that receives the incoming IF signals and digitizes them. The resulting digitized signals can be provided to a front end 134 which can perform further processing including down conversion to a baseband frequency, filtering and so forth. The resulting signals can be provided to a demodulator 136 which demodulates the signals by means of a Fast Fourier Transform (FFT) and provides them to an equalizer 138, details of which will be described further below. The resulting equalized signals can then be provided to a forward error correction (FEC) circuit 140 that performs error correction to thus generate an output transport stream. Although shown at this high level in the embodiment of FIG. 1, understand the scope of the present invention is not limited in this regard.

Figure 2:
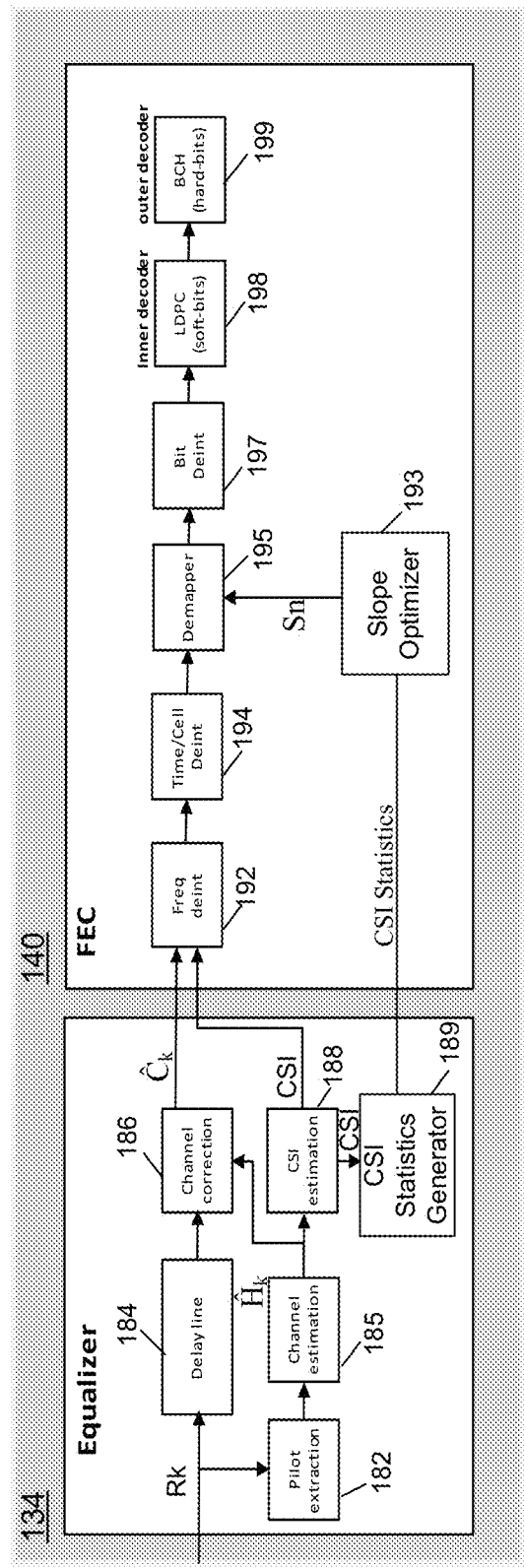
FIG. 2 is a block diagram showing further details of a demodulator in accordance with an embodiment of the present invention.

Referring now to FIG. 2, shown are further details of a demodulator in accordance with an embodiment of the present invention. More specifically, FIG. 2 shows further details of an equalizer and FEC circuit of the demodulator. As seen, equalizer 134 is configured to receive incoming signals $R_k$, which have been demodulated. As seen, these signals are provided to a pilot extraction circuit 182 and a delay line 184. Delay line 184 thus outputs the delayed demodulated signals $R_k$ to a channel correction circuit 186 that generates equalized complex data $\hat{C}_k$, which is the estimate of the complex data $C_k$ emitted at the transmitter side. In various embodiments, channel correction circuit 186 can use a channel estimate $\hat{H}_k$ for correcting the incoming data according to $$\hat{C}_k = \frac{R_k}{\hat{H}_k}.$$

Unfortunately this complex data $\hat{C}_k$, are not exactly centered on the constellation points because of the presence of channel impairments (noise, interferers, channel estimation errors and so forth).

The channel estimate $\hat{H}_k$ generated by a channel estimation circuit 185, which is coupled to an output of pilot extraction circuit 182, which extracts scattered pilots from the T2 frame and provides the pilots to channel estimation circuit 185 which uses the pilots to calculate the channel estimate ($\hat{H}_k$). This channel estimate $\hat{H}_k$ is also provided to a channel state information (CSI) estimation circuit 188, which generates channel state information, which is also provided to the forward error correction circuit. Thus in parallel to channel correction, equalizer 134, via CSI estimation circuit 188, computes the CSI, which provides an estimation of the signal-to-noise ratio (SNR) for each carrier of the OFDM spectrum. This quantity is generally approximated by $CSI(k)|\hat{H}_k|^2$. This information provides the reliability of each received carrier and thus the confidence of the data conveyed on each of them. As further seen, the determined CSI is also provided to a CSI statistics generator 189, which generates the statistics based on the channel state information. As will be discussed further below, these CSI statistics can be used to determine an optimal slope value to provide to a demapper.

Still referring to FIG. 2, FEC circuit 140 thus receives the estimated complex data $\hat{C}_k$ along with the CSI and the CSI statistics. More specifically, both the estimated complex data $\hat{C}_k$ and CSI may be provided to a frequency deinterleaver 192, which frequency deinterleaves the data and provides the results to a time/cell deinterleaver 194 that in turn is coupled to a demapper 195.

In turn demapper 195 generates an estimated log-likelihood ratio (LLR) or so-called soft bits, and thus demapper 195 computes a bit-metric or LLR for each bit conveyed in the received cells. As further seen, demapper 195 further receives slope values Sn from a slope optimizer 193, details of which will be described further below. As seen, slope optimizer 193 is coupled in a feed forward manner from CSI statistics generator 189 to receive statistical information from the equalizer and determine optimum slope values based thereon. Slope optimizer 193 thus receives the CSI statistics and uses the same in generating optimized slope values.

In turn, demapper 195 provides scaled LLR values to a bit deinterleaver 197 which provides these deinterleaved bits to a low density parity checker (LDPC) decoder 198. LDPC decoder 198 acts as an inner decoder to generate hard decoded bits which in turn are provided to a BCH decoder 199 which acts as an outer decoder to finalize the error correcting to thus provide a hard decision which can be sent to a source decoder. Although shown with this particular implementation in the embodiment of FIG. 2, understand the scope of the present invention is not limited in this regard. For example in other embodiments, soft decoded bits can be provided from LDPC decoder 198 to BCH decoder 199.

Figure 3:
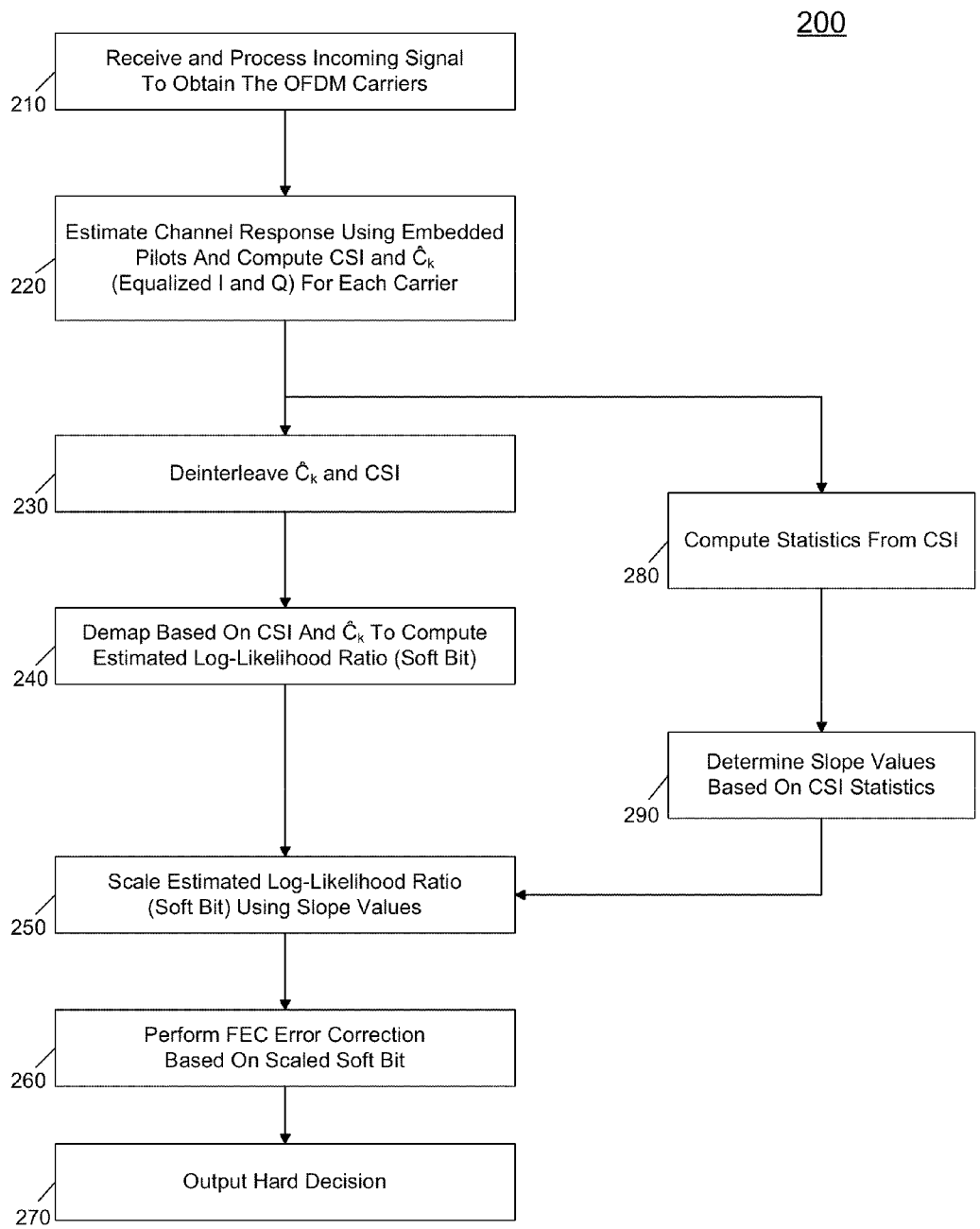
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 can be implemented within various circuitry of a demodulator including demodulation circuitry, equalizer circuitry and FEC circuitry. Of course, embodiments can be implemented within other circuitry or logic of a receiver. As seen, method 200 may begin by receiving and processing incoming signals to obtain OFDM carriers (block 210). In various embodiments, this processing can be performed by means of a fast Fourier transform (FFT) engine, along with front end circuitry to perform various processing.

Next, control passes to block 220 where a channel response can be estimated using embedded pilots within the received signal. From this information, an equalizer can compute CSI and equalized complex data, e.g., equalized I and Q signals, $\hat{C}_k$, for each carrier. This information can then be provided from the equalizer to an FEC circuit, where, at block 230 the equalized data $\hat{C}_k$ and the CSI can be deinterleaved. Control next passes to block 240 where the data can be demapped based on the deinterleaved information to compute estimated log-likelihood ratio values, namely soft bits.

As will be described further below, embodiments can perform scaling on this estimated LLR data to generate scaled estimated LLRs using slope values obtained in accordance with an embodiment of the present invention. Thus at block 250 these scaled estimated LLR values can be obtained and then at block 260, FEC error correction, which can include inner and outer decoding, can be performed on the scaled soft bits. Note that in some embodiments, further deinterleaving can be performed prior to such FEC error correction. The result of this error correction thus corresponds to hard bits, which can be output as a hard decision to additional processing logic such as a source decoder (block 270).

Still referring to FIG. 3, note that the CSI data can further be used to compute statistics at block 280, e.g., in a CSI statistics generator of the equalizer, which can be communicated to FEC circuitry, more particularly to a slope optimizer, in one embodiment. Thus a feed forward operation occurs from the equalizer to provide statistical information for use in scaling LLR values. Then at block 290, slope values can be determined based on this CSI statistics. More specifically, optimized slope values for current channel impairments can be determined using the CSI statistical information and further information, namely reference slope values, as described further below. As seen, these optimized slope values can then be used to scale the estimated LLRs as described above at block 250. Although shown with this particular implementation in the embodiment of FIG. 3, understand the scope of the present invention is not limited in this regard.

To further understand how optimized scaled values can be applied, it is instructive to understand the generation of the LLR values in a demapper. In one embodiment, the LLR quantities computed by the demapper are given by the following equation:

$$LLR(b_i) = \log\left[\frac{\sum_{x \in C_i^1} e^{-\frac{D_{euc}^2(x)}{2\sigma^2}}}{\sum_{x \in C_i^0} e^{-\frac{D_{euc}^2(x)}{2\sigma^2}}}\right] \quad [EQ. 1]$$

where $D_{suc}^2(x) = |CSI.\hat{C}_k - x|^2$, $C_i^j$ denotes the set of constellation points x for which the ith bit $b_i$ takes the value j (j=0 or 1) and $\sigma^2$ denotes the noise variance of the carrier conveying the data. In a digital implementation, the quantities CSI, $\hat{C}_k$ and LLR are quantized.

In actual implementations, the LLR equation above may be simplified to improve hardware efficiency. To this end, a max-log approximation can be used to reduce the complexity. The LLR values become then:

$$L\tilde{L}R(b_i) = \frac{1}{2\sigma^2}\left[\min_{x \in C_i^0}(D_{euc}^2(x)) - \min_{x \in C_i^1}(D_{euc}^2(x))\right] \quad [EQ. 2]$$

The values CSI and $\hat{C}_k$ generated in the equalizer may pass through two deinterleavers, as described above, namely frequency deinterleaver 192 and time/cell deinterleaver 194, which can be memory-consuming with the size of the memory proportional to the number of bits used for the quantization. But as can be seen in the above EQ. 2, the quantization process affects the computation of the LLR quantities and thus the performance of the receiver. Accordingly, a tradeoff exists between memory size and performance.

Moreover the LDPC block size is a function of the LLR's word length. So the LLR's can be quantized on a certain number of bits; which may be desired to be as small as possible. But a word length too small will degrade the decoding performance. It is possible to mitigate the degradation due to the quantization process by applying a slope value to the calculated LLR's prior to quantization. The optimal slope value for a fixed channel depends on the code rate. The calculation of LLRs becomes:

$$L\tilde{L}R(b_i) = Q_N\left(\text{slope}(i) \cdot \frac{1}{2\sigma^2}\left[\min_{x \in C_i^0}(D_{euc}^2(x)) - \min_{x \in C_i^1}(D_{euc}^2(x))\right]\right) \quad [EQ. 3]$$

where $Q_N(.)$ denotes the linear quantization process on N bits, and slope(i) is the slope value.

Or by integrating the sigma$^2$ estimation in the slope parameter:

$$L\tilde{L}R(b_i) = Q_N(\text{slope}(i).[\min_{x \in C_i^0}(D_{euc}^2(x)) - \min_{x \in C_c^1}(D_{duc}^2(x))]) \quad [EQ. 4]$$

where $Q_N(.)$ denotes the linear quantization process on N bits, and slope(i) is the slope value with an integrated sigma$^2$ estimation.

By integrating the sigma$^2$ parameter in the slope factor (EQ. 4), no effective sigma$^2$ estimation has to be implemented. Note this it is however possible to optimize the slope jointly to the sigma² estimation (EQ. 3) knowing that a biased estimation of sigma² would lead to a degradation of the LDPC decoding performances.

Figure 4:
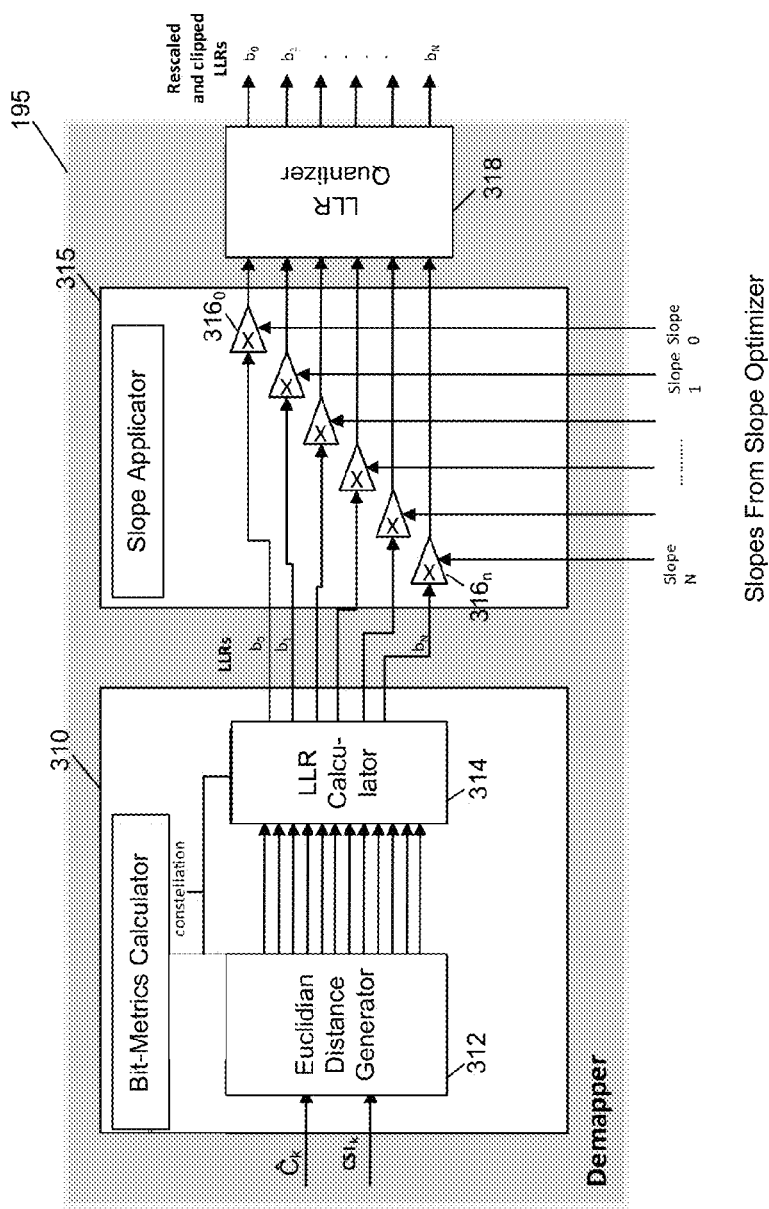
FIG. 4 is a block diagram of details of a demapper in accordance with an embodiment of the present invention.

Referring now to FIG. 4, shown is a block diagram of details of a demapper in accordance with an embodiment of the present invention. As shown in FIG. 4, demapper 195 is configured to receive equalized data $\epsilon_k$ and channel state information, $CSI_k$. As seen, these values can be provided to a bit-metrics calculator 310, which based on a given constellation can generate Euclidian distances in a Euclidian distance generator 312. These resulting distances can then be provided to a LLR calculator 314, which generates LLR values in accordance with a selected one of the above equations. Resulting estimated LLRs can be provided to a slope applicator 315. As seen, slope applicator 315 may include a plurality of gain blocks $316_0$-$316_n$, each of which receives a corresponding slope value generated in a slope optimizer (not shown in FIG. 4). Accordingly, slope applicator 315 (generally) each can perform an operation such as a multiplication between the corresponding optimized slope value and an incoming estimated LLR bit to generate a slope-optimized LLR value that is rescaled. These rescaled values may then be provided to a quantizer 318, which thus quantizes the resulting LLR values to generate a soft decision that is a rescaled, quantized and clipped LLR value, to be provided to a decoder such as an LDPC decoder, described above.

In order to obtain optimal performance for each situation, the slope value may be optimized depending on different parameters. In one embodiment, 3 parameters can be considered: code rate; constellation; and channel type. The first two parameters are known at the receiver side because they are transmitted by the modulator and are recovered by the receiver. Thus to provide optimized slope information for these two parameters, a lookup table, e.g., a 2 input table $slope_{ref}^i$(code_rate,constellation) can be implemented in the receiver that provides an optimized slope for each code rate and constellation and which also differentiates between normal and short FEC blocks. These entries can store reference slopes that correspond to an optimal slope value in a purely additive white Gaussian noise (AWGN) channel. Note that the reference slopes can include a sigma² value. The third parameter, channel type, is not known at the transmitter side. Rather, channel type is dynamic and not characterized by a finite set. In some implementations, a tradeoff can be made between the different kinds of channel type, however this may result in unacceptable performance degradation.

Figure 5:
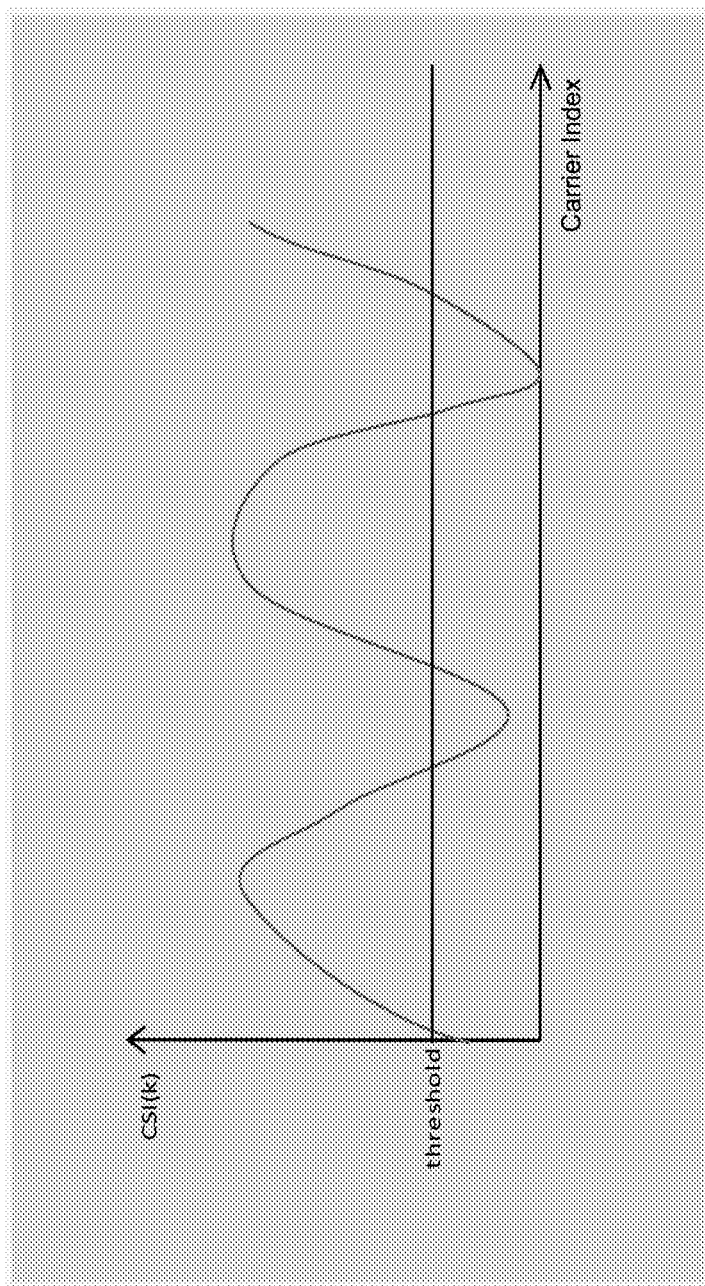
FIG. 5 is a graphical illustration which shows relevant statistics to be used for slope optimization in accordance with one embodiment of the present invention.

Instead embodiments provide a way to model the channel type and weight the reference slopes accordingly. More specifically a CSI curve CSI(k), a representative version of which is shown in FIG. 5, can be analyzed to deduce relevant statistics to be used for the slope optimization. In various embodiments, these statistics can relate a measure of the CSI to a threshold. More specifically, for a given OFDM symbol a count can be made of the number of carriers or indexes L for which CSI(k)<threshold. This statistic provides an approximation of the deepness of the channel fadings. Note that the statistical analysis can be done every OFDM symbol or can be averaged over several OFDM symbols.

By simulation or testing, optimal weighting factors providing the best performance for different channel conditions may be determined. In some embodiments, a weighting function can be provided to generate a weighting value from the statistical information (e.g., the count value L). To this end a function generator may be provided in some embodiments. In other embodiments a table-based approach may be provided in which the statistical information is used to access a lookup table to obtain a weighting value, which may be based on a given weighting function. Of course, other manners of determining a weighting value can be effected in other embodiments. In some embodiments, this optimization depends on the actual quantization parameter implemented in the demapper.

Figure 6A:
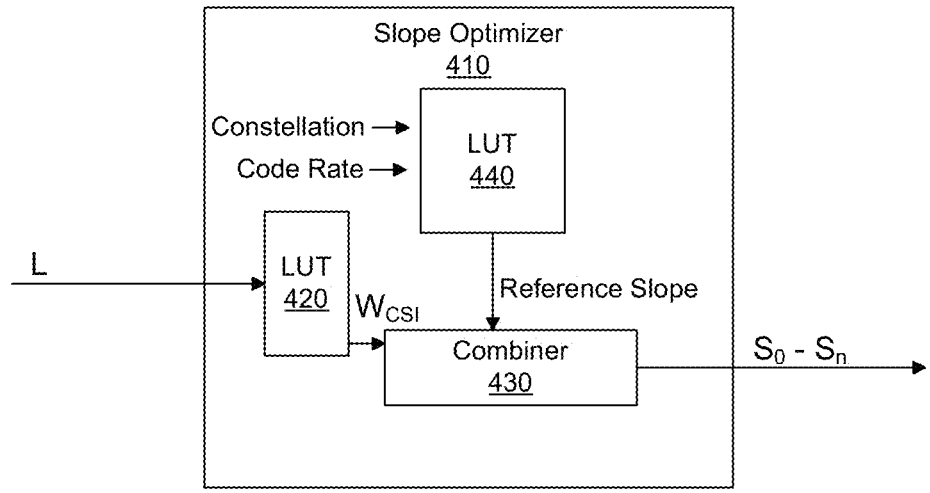
FIG. 6A is a high level block diagram of a slope optimizer in accordance with one embodiment of the present invention.

Referring now to FIG. 6A, shown is a high level block diagram of a slope optimizer in accordance with one embodiment of the present invention. A slope optimizer can be dedicated hardware such as a co-processor, discrete logic, a portion of DSP, or other circuitry. As shown in FIG. 6A, slope optimizer 410 is configured to receive statistical information based on the CSI. In the embodiment shown, this statistical information may correspond to a count L, e.g., a number of carriers within a symbol falling below a threshold CSI level. This count value can be provided to a lookup table 420 of slope optimizer 410 which includes various weighting values for different channel conditions. More specifically, the count value L can be used to access a given entry of the table that has a corresponding weighting value. As seen, this weighting value, $W_{CSI}$, can be provided to a combiner 430 where it can be combined with a reference slope value from another lookup table 440. As described above, this lookup table can include entries that provide a reference value, e.g., for an AWGN channel for a given constellation and code rate. Thus based on an indicated code rate and constellation, a given entry of LUT 440 can be accessed and a stored reference slope value can be output. In various embodiments, combiner 430 can perform a multiplication to thus obtain a product corresponding to an optimized slope value $S_0$-$S_n$.

Figure 6B:
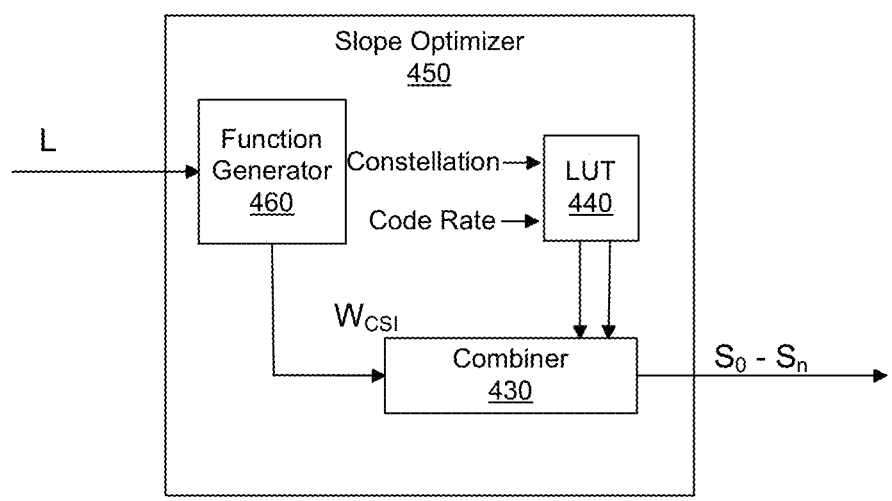
FIG. 6B is a high level block diagram of a slope optimizer in accordance with another embodiment of the present invention.

Although shown with this particular arrangement in the embodiment of FIG. 6A, understand that instead of a table-based approach to determining a weighting value, a function generator can be used. Referring now to FIG. 6B, shown is a block diagram of a slope optimizer in accordance with another embodiment of the present invention. As shown in FIG. 6B, slope optimizer 450 may similarly receive statistical information. More specifically, this information can be provided to a function generator 460 which may generate a weighting value $W_{csI}$ based on the incoming statistical information. As above, this weighting value can be provided to a combiner 430, which combines it, e.g., via a multiplication, with an output of lookup table 440 to thus generate optimized slope values $S_0$-$S_n$. Although shown with this arrangement in the embodiment of FIG. 6B, of course other implementations of a slope optimizer are possible.

Example weighing functions are shown in FIGS. 7A and 7B, which show a step function and a continuous function, respectively. Note that the scope of the present invention is not limited to the 2 weight functions shown in FIGS. 7A and 7B, and other weighting functions are possible. Also, while a counter-based statistical implementation is described above, other statistical parameters obtained from CSI can be used to represent the channel characteristics and which can then be used for slope optimization. For example the average and variance analysis on CSIs for each OFDM symbol can be used.

The final slope value provided to the demapper may thus be a combination of a reference slope value (e.g., an AWGN slope value obtained from a table lookup) weighted by a weighting value, $W_{CSI}$, responding to the channel type as follows:

$$slope(i) = slope_{awgn}^i(code\_rate, constellation) \cdot w_{csi}(i)$$
$$where\ w_{csi}(i) \geq 1 \quad [EQ.\ 5]$$

Embodiments thus provide a scale factor optimization applied to an LLR (or estimated LLR) that is dependent on the channel characteristics, which can be obtained from an equalizer. Furthermore, CSI statistical information can be used to set the scale factor applied to the LLR to get the best decoding performance. As seen above, the scale factor optimization is performed as a one-shot optimization (e.g., at a minimum after each OFDM symbol), which does not need any convergence phase, thus providing speed and efficiency. More so, channel variation can be followed based on CSI statistics to adapt the slope regularly (e.g., at a minimum after each OFDM symbol). In this way, good decoding performance can be maintained even in a dynamic environment. The CSI statistics can be used to obtain information on the channel characteristics and thus to weight the reference slope. In addition to using CSI statistics to estimate the type of the channel, other receiver parameters can be adapted on this basis. For example, this information can be used to adapt the dynamic slope adjustment and quantization along the data path and adapt some parameters of the synchronization process.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   generating a channel estimate for a channel traversed by a signal from a transmitter to a receiver;
   computing channel state information from the channel estimate;
   computing statistical information from the channel state information;
   determining a slope value based at least in part on the statistical information;
   calculating a log-likelihood ratio (LLR) value for the signal; and
   applying the slope value to the LLR value to obtain a weighted LLR value.

2. The method of claim 1, further comprising generating hard decision bits from the weighted LLR value using an error correcting decoder.

3. The method of claim 1, wherein computing the statistical information comprises obtaining a count of channel state information values of a symbol of the signal below a threshold value.

4. The method of claim 1, further comprising applying the statistical information to one of a plurality of functions to obtain a weighting value.

5. The method of claim 4, wherein determining the slope value comprises combining the weighting value with a reference slope value associated with a type of communication associated with the signal.

6. The method of claim 5, wherein the reference slope value is based on a code rate and a constellation for the type of communication.

7. The method of claim 1, further comprising accessing a table using the statistical information to determine a weighting value, and combining the weighting value with a reference value to obtain the slope value.

8. An apparatus comprising:
   an equalizer to receive a demodulated signal and to output equalized data generated from the demodulated signal, channel state information based on a channel estimate of a channel between a transmitter and a receiver, and statistical information regarding the channel state information to a forward error correction (FEC) circuit; and
   the FEC circuit coupled to the equalizer to receive the equalized data, the channel state information, and the statistical information and to generate a log-likelihood ratio (LLR) value based on the equalized data and the channel state information and to automatically adjust a slope value to apply to the LLR value using the statistical information.

9. The apparatus of claim 8, wherein the FEC circuit is to generate a scaled LLR value using the LLR value and the slope value and to generate a hard decision using the scaled LLR value via an error correction decoder.

10. The apparatus of claim 8, wherein the FEC circuit comprises a slope optimizer to use the statistical information to generate the slope value.

11. The apparatus of claim 8, wherein the statistical information corresponds to a count of carriers of a symbol of the demodulated signal having a channel state information value below a threshold.

12. The apparatus of claim 10, wherein the slope optimizer is to determine a weighting value based on the statistical information and to generate the slope value using the weighting value and a reference slope value.

13. The apparatus of claim 12, wherein the reference slope value is selected from a plurality of reference slope values based on the channel, each of the reference slope values associated with a different channel.

14. The apparatus of claim 12, wherein the reference slope value is based on a constellation and a code rate associated with the demodulated signal.

15. The apparatus of claim 12, wherein the slope optimizer is to apply the statistical information to a function generator to obtain the weighting value.

16. The apparatus of claim 12, wherein the slope optimizer is to access an entry of a lookup table using the statistical information, the lookup table entry including the weighting value.

17. A system comprising:
   a tuner circuit to receive a broadcast signal and to output an intermediate frequency (IF) signal;
   a digital demodulator circuit coupled to the tuner circuit, the digital demodulator circuit including:
      a digitizer to receive the IF signal and to digitize the IF signal;
      a front end circuit to receive the digitized IF signal and to output a baseband signal;
      a demodulator to generate a demodulated signal from the baseband signal;
      an equalizer to receive the demodulated signal and to output equalized data generated from the demodulated signal, channel state information based on a channel estimate of a channel traversed by the broadcast signal, and statistical information regarding the channel state information; and
      a forward error correction (FEC) circuit coupled to the equalizer to receive the equalized data, the channel state information, and the statistical information and to generate a log-likelihood ratio (LLR) value based on the equalized data and the channel state information and to scale the LLR value based on a slope value generated using the statistical information.

18. The system of claim 17, wherein the tuner circuit and the digital demodulator circuit are configured in a single integrated circuit (IC).

19. The system of claim 17, wherein the equalizer includes a statistical generator to generate the statistical information from the channel state information.

20. The system of claim 19, wherein the statistical generator is to update the statistical information for each symbol of the demodulated signal or to average the statistical information over a plurality of symbols.

21. The system of claim 17, wherein the FEC circuit includes a slope optimizer to obtain a weighting value based on the statistical information and to combine the weighting value and a reference slope value to obtain the slope value.

22. The system of claim 21, wherein the reference slope value is dependent on a constellation and a code rate of the broadcast signal.

23. The system of claim 17, wherein the FEC circuit includes a demapper comprising:
   a bit-metric calculator to generate a plurality of bit-metrics from the equalized data;
   an applicator including a plurality of gain blocks each to receive a bit-metric and a portion of the slope value and to output a scaled bit-metric; and
   a quantizer to receive the scaled bit-metrics and to output a scaled and clipped soft decision based thereon.

* * * * *